INVENTORS
SHIGEAKI SUGANO
KYOZO UESUGI
BY
ATTORNEY

United States Patent Office
3,671,109
Patented June 20, 1972

3,671,109
FOCUSING MECHANISM FOR CATADIOPTRIC OBJECTIVE
Shigeaki Sugano, Tondabayashi, and Kyozo Uesugi, Sakai, Japan, assignors to Minolta Camera Co., Ltd., Osaka, Japan
Filed June 16, 1970, Ser. No. 46,714
Claims priority, application Japan, June 19, 1969, 44/48,607
Int. Cl. G02b 5/10, 7/10, 17/08
U.S. Cl. 350—299                                        9 Claims

ABSTRACT OF THE DISCLOSURE

An adjustable focus multi-reflector optical device such as of the cassegrainian or catadioptric type includes a main barrel supporting a stationary first reflector, and a smaller diameter internally threaded sleeve coaxially mounted in the main barrel. An externally threaded collar mounting a second reflector is located in and engages the thread in the sleeve and a handle extends radially from the collar through a peripheral slot in the main barrel and is rotatable with the collar and connected thereto so as to be resiliently axially and radially movable relative to the collar.

BACKGROUND OF THE INVENTION

The present invention relates generally to improvements in optical devices and it relates particularly to an improved multi-reflector optical device of adjustable focus as typified by the Cassegrain systems where only reflectors are employed and the catadioptric systems where reflectors and lenses are employed.

In the conventional adjustable focus catadioptric objective lens system, as illustrated in FIG. 4 of the drawing, an incident ray 1a traverses a front lens 6a which in some cases may be of zero power or a flat transparent annulus, is reflected forwardly by an annular rear mirror reflector 3a to a front second mirror or reflector 7a which reflects the ray rearwardly through a system of lenses toward a focal plane. The mirror 3a is mounted in the rear of a rear barrel section 4a provided at its rear with a coupling section 2a for attachment to a camera body and provided with an external helicord thread 5a at its front. A front barrel section 9a is provided intermediate its ends with an internal thread 10a which engages thread 5a so that rotation of section 9a relative to section 4a effects the relative axial movement thereof and the lens 6a is mounted in the front end of barrel section 9a. The mirror 7a is centrally mounted on the rear face of the lens 6a and is provided with a rearwardly projecting shield collar 8a.

Two methods are generally employed for setting the distances or focussing the above lens system. In accordance with the first method the front barrel section 9 is rotatably adjusted relative to the rear barrel section 4a to thereby axially adjust the lens 6a and reflector 7a relative to reflector 3a and the other lenses. According to the second method the focussing is effected by adjusting the distance between the entire lens assembly or objective and the camera film plane such as by means of a rack and pinion mount between the lens barrel and the camera or by means of other axial adjustment mechanisms such as a helicoid track and follower, which may be mating threads, and the like.

Among the disadvantages of the first focussing method are as follows: (a) since the diameters of the male and female threads 5a and 10a are large, the precise working thereof is difficult, thereby increasing the play and the eccentricity and leading to an instability in the images; (b) owing to the large diameter of the focussing ring 9a, it is very difficult to operate the distance setting while hand holding the device, especially when the diameter of the ring 9a is more than 120 mm., where it is almost impossible to operate whereby the focal distance and the lens aperture are restricted; (c) due to the large number of large-diameter components, the manufacturing cost as well as the weight of the device are high; (d) since the distance setting is effected by moving the distance ring 9a which has a large diameter, the rate of change of the internal volume is great with a consequent great change in the internal pressure, thus necessitating the use of air venting holes and dust filters; (e) since a super telephoto lens has a narrow image angle, a subject to be photographed is brought within the field of view by the use of front and rear sights but the optimum positioning of these sights is impossible due to the rotation of the distance ring 9a, and (f) because of the fact that the distance ring 9a and the second mirror 7a are rigidly integral with each other, and inclination of the distance ring 9a, which is caused by an external pressure applied on the distance ring 9a, appears as a deflection at the second mirror 7a, and this is enlarged up to twenty times, serious defects in the photographing occurs.

Among the disadvantages of the second is that the main purposes of adopting the reflection mirror optical system for a super telephoto lens is to render the device light and compact, and this object can best be satisfied when the first mirror is near the film surface, but in a super telephoto lens, the amount of change in the focal length from the rear lens from infinity to the closest photographing distance is very large, and also it is necessary to arrange the axial adjusting means between the reflecting mirror optical system and the lens mount to cover the amount of change in the rear focal length due to distance setting, so that the closest photographing distance is not shortened; and also due to the fact that the first mirror is unable to closely approach the film surface and because of the large amount of axial traverse in the distance setting operation, the center of gravity changes considerably, causing instability in the support of the device by a tripod, etc.

SUMMARY OF THE INVENTION

It is a principal object of the present invention to provide an improved adjustable optical device.

Another object of the present invention is to provide an improved adjustable multi-reflector objective system.

Still another object of the present invention is to provide an improved adjustable focus catadioptric object lens device.

A further object of the present invention is to provide an optical device of the above nature characterized by its reliability, stability, compactness, ruggedness, precision, relatively low cost and excellent optical properties.

In a sense the present invention contemplates the provision of an adjustable multi-reflector optical device comprising a main barrel, a first mount supported in said main barrel and spaced from the walls thereof, a second reflector member, a second mount supporting said second reflector member and engaging said first mount, said first and second mounts having helicoid track and follower means whereby rotation of said second mount relative to said first mount effects the axial movement of said second mount and second reflector, and a control element extending outwardly from said second mount toward said main barrel.

In its preferred form as applied to a catadioptric objective lens the main barrel has an annular first mirror and coaxial central rear lenses mounted in the rear thereof and an annular front lens mounted in the front thereof. An internally threaded collar registers with the front lens central opening and the second mirror is mounted in an externally threaded sleeve engaging the internally threaded collar. A handle member extends radially from the mirror sleeve through a peripheral slot in the barrel and the manipulated outer end of the handle member is axially and radially resiliently flexible so as to prevent the transmission of non-rotative forces to the mirror sleeve.

The present improved device possesses the following advantages: (a) the device obviates the use of large diameter helicoid threads so that the threads can be accurately machined to lessen the play at the threads as well as the amount of eccentricity, and a stable image is thus obtained; (b) the distance setting or focussing operation is highly facilitated; (c) the operation of the device is easy because the distance setting can be effected by the focus handle, whereby the focussing as well as the diaphragm opening are not restricted even when a mirror barrel having an outer diameter of 120 mm. or more if used; (d) owing to the small number of large diameter components, the manufacturing cost and the weight of the device are reduced; (e) no air vent hole or dust filter is needed be cause only the second mirror is moved, and therefore the rate of internal volume variation is small (while the rate of internal volume variation of a conventional reflector type telephoto lens is 4.7%, that of the present telephoto lens is 0.5%); (f) front and rear sights can be easily mounted because the main barrel is fixed from end to end; and (g) unsteadiness of the second mirror is obviated by the shock-absorbing adjustment action, reducing external pressure which is unnecessary for distance setting, etc.

Furthermore, the present device has the further advantages such as: (a) since the distance setting is carried out by means of the second mirror, and the relative position between optical system, other than the second mirror and the camera body is not varied, the first mirror can be located very near the film surface, so that a reduction in the size and weight of the device is achieved; (b) the movement of the second mirror being very small, the minimum close-up taking distance is greatly diminished; (c) only the second mirror, which is light in weight, is moved, so that the amount of variation in the position of center of gravity is small, increasing the stability of the tripod mounted device, etc.

DESCRIPTION OF THE PREFERRED EMBODIMENTS

Figure 1:
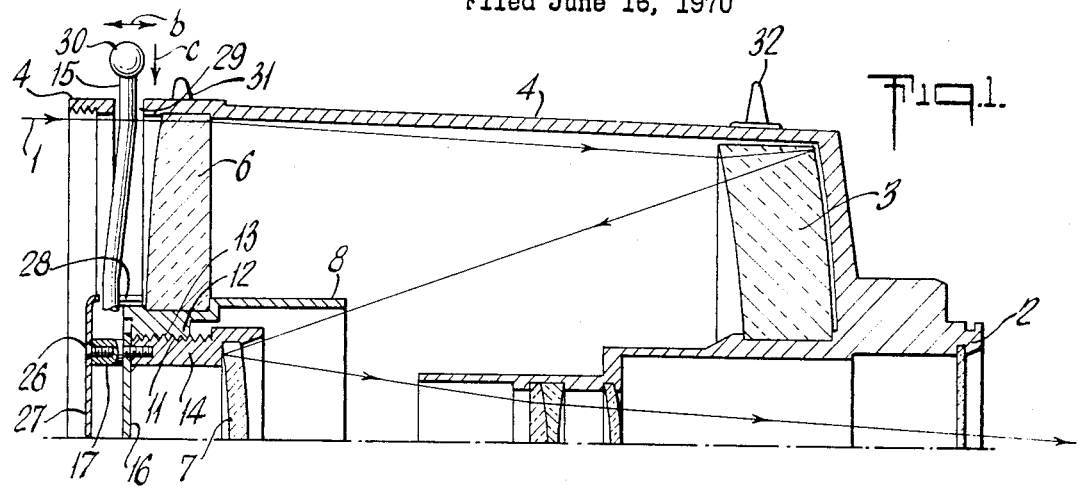
FIG. 1 is a half-cut longitudinal sectional view of a catadioptric objective embodying the present invention.
Figure 4:
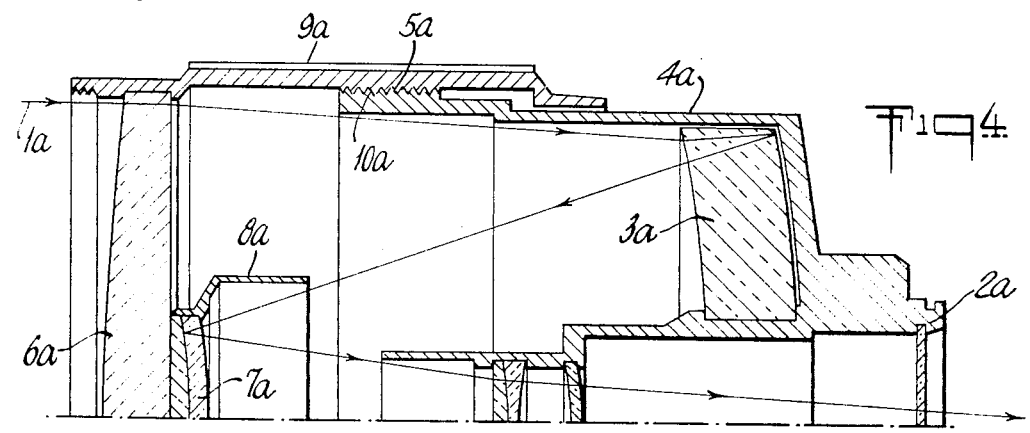
FIG. 4 is a half-cut longitudinal sectional view of a conventional catadioptric objective.
Figures 2, 3:
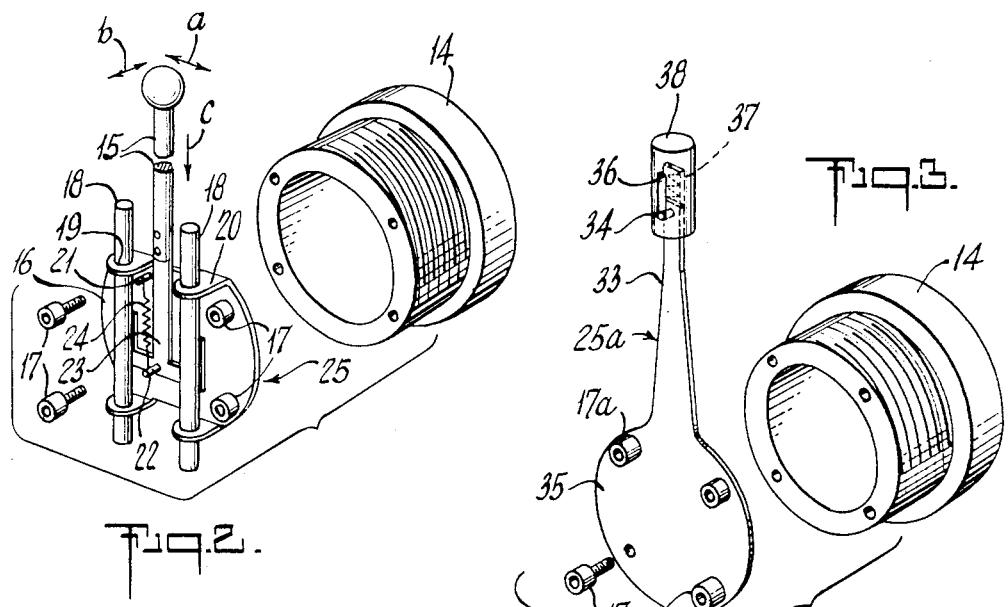
FIG. 2 is an exploded perspective view of the reflector adjusting mechanism.
FIG. 3 is an exploded perspective view of a reflector adjusting mechanism in accordance with another embodiment of the present invention.

Referring now to the drawings, particularly FIGS. 1 and 2 thereof which illustrate a preferred embodiment of the present invention, the reference numeral 4 generally designates a unitary main barrel provided with a rear coupling section 2 for connection to a camera body. As in the conventional catadioptric lens a rearwardly reflecting first reflector member 3 of annular shape is fixedly mounted in the rear of main barrel 4 and a coaxial integrally formed small diameter lens carrying barrel projects therethrough.

Mounted in the leading section of main barrel 4 is an annular lens 6 which may be a flat transparent plate, and registering with and affixed in the central opening of lens 6 is a first supplentary barrel or collar 12 coaxial with main barrel 4 and provided with a rearwardly directed tubular shield 8 and an internal helicoid thread 11. A second barrel or sleeve 14 registers with collar 12 and is provided with an external helicoid thread 13 which engages thread 11. A forwardly reflecting second mirror or reflector 7 is mounted in the rear section of sleeve 14. An incident light ray 1 traverses lens 6, is reflected forwardly by reflector 3 to reflector 7 which reflects it rearwardly through the rear lens system toward a focal plane.

The lens system is adjusted or focussed by rotating sleeve 14 in collar 12 to axially adjust the position of reflector 7 and to facilitate such rotation without imparting any shock or deflecting stress to the lens system components attendant to such adjustment there are provided a handle 15 and an elastic or resiliently flexible coupling mechanism 25.

The coupling mechanism 25 includes a mounting plate 16 secured to the front face of sleeve 14 by means of cylindrically headed screws 17 and has integrally formed therewith laterally spaced pairs of vertically spaced forwardly directed ears 20 having corresponding vertically aligned openings 19 formed therein. A pair of parallel slide rods 18 register with openings 19 and are vertically movable therein, and are connected between ears 20 by the crossbar of a T-shaped leaf spring member 23 which includes an upwardly directed leg which is forwardly and rearwardly longitudinally or axially flexible, that is along a direction parallel to the axis of barrels 4, 12 and 14. A helical tension spring 24 is connected between a pin 21 on the upper part of plate 16 and a pin 22 on the crossbar of spring member 23 to resiliently urge the latter and slide rods 18 radially outwardly or upwardly while permitting their movement radially downwardly as indicated by the direction of arrow c.

A cover plate or cap 27 defines with plate 16 a housing for mechanism 25 and is secured thereto by screws 26 engaging tapped bores in the cylindrical heads of screws 17. The handle 15 is a thin rod, for example 3 millimeters in diameter, and has its inner end affixed to the free end of the resilient leg of spring member 23. The handle 15 extends radially from member 23 through an opening 28 in cap 27 and through a helical slot 29 in barrel 4 having the same lead as threads 11 and 13. The handle 15 terminates in a spherical finger piece or knob 30 positioned outside the outer face of barrel 4. Axially aligned front and rear sights 31 and 32 are mounted atop and proximate the front and rear ends respectively of main barrel 4.

Considering now the operation of the improved objective it is directed toward the object by sighting along sights 31 and 32 and focussing is preformed by turning handle 15 about the optical axis of the objective, as illustrated by arrow a, whereby to turn sleeve 14 and axially adjust the position of reflector 7. Forces which are applied to the handle 15 which have components at an angle to the turning force are absorbed through the mechanism 25. Longitudinal forces along the direction of arrow b are taken up by the flexing of the flexible resilient leg of spring member 23, whereas radial forces along the direction of arrow c are taken up by the sliding movement of rods 18 in ears 20 and the stretching of spring 24, release of these forces permit the return of handle 15 to its normal position by springs 23 and 24. It should be noted that experimental tests have demonstrated that the location of handle 15 in front of lens 6 does not adversely effect the resolution of the lens system on the image at the focal plane in any significantly observable amount.

In FIG. 3 there is illustrated another shock absorbing handle assembly which may be substituted for handle 15 and mechanism 25 of the last described embodiment. Specifically, a handle member 25a is formed of a flexible resilient or spring material and includes a circular plate section 35 connected by screws 17a to the front of the inner barrel or sleeve 14, and a radial projecting arm 33, which may have a width of about 3 millimeters and which projects through the helical slot in the objective main barrel, the arm 33 being resiliently flexible in the axial direction. A cup shaped knob 38 slideably engages the outer end of arm 33 and is slideably secured thereto by a pin 34 fixed to the arm 33 and engaging a vertical guide slot 36 in knob 38. A helical compression spring 37 housed in knob 38 is entrapped between the pin 34 and the top wall of knob 38 to resiliently urge knob 38 to its outermost position on arm 33. Thus longitudinal or axial forces are absorbed by the corresponding flexing of spring arm 33 and inward radial forces are absorbed by compression spring 37. In all other respects the last described embodiment operates in the manner of that first described.

While there has been described and illustrated preferred embodiments of the present invention, it is apparent that numerous alterations, omissions and additions may be made without departing from the spirit thereof. For example, other means may be employed for providing a shock absorbing coupling between the focussing knob and the reflector carrying inner barrel. Moreover, the optical elements may be individually modified as may be the overall optical system.

We claim:

1. An adjustable multi-reflector optical device comprising a main barrel, a first reflector member rearwardly mounted in said main barrel, a first mount means supporting said first mount in the forward portion and spaced from the walls of said main barrel, a light passageway into said barrel being provided between said barrel and said first mount, a second reflector means of lesser diameter than said first reflector member, a second mount carrying said second reflector means and engaging said first mount, said first and second mounts having engaging helicord track and follower means whereby rotation of said second mount relative to said first mount effects the axial movement of said second mount and second reflector means, and a control member extending from said second mount.

2. The multi-reflector optical device of claim 1 wherein said control member comprises a handle member extending outwardly from and rotatable with said second mount and projecting beyond the outer face of said main barrel.

3. The multi-reflector optical device of claim 2 wherein the outer end of said handle member is axially and radially resiliently movable relative to said second mount.

4. The multi-reflector device of claim 1 wherein said fifirst mount comprises an internally threaded collar coaxial with said main barrel and said second mount comprises an externally threaded sleeve located in and engaging said collar.

5. The multi-reflector device of claim 4 wherein said supporting means include a transparent annulus mounted in the forward portion of said main barrel and having an axial opening therein, said collar engaging said axial opening.

6. The multi-reflector device of claim 5 wherein said transparent annulus is a lens.

7. The multi-reflector device of claim 4 wherein said main barrel has a peripherally extending slot formed therein and said control member comprises a handle member extending outwardly from said collar and rotatable therewith and projecting through said slot.

8. The multi-reflector device of claim 7 including means connecting the inner section of said handle member to said sleeve for resilient longitudinal and radial movement of said handle relative to said collar.

9. The reflector device of claim 7 wherein said handle member includes an outwardly extending longitudinally resiliently flexible inner section and an outer section inwardly and outwardly movable on said inner section and outwardly spring urged.

References Cited

UNITED STATES PATENTS

| | | | |
|---|---|---|---|
| 3,064,526 | 11/1962 | Lindsay | 350—294 X |
| 2,124,161 | 7/1938 | Cook et al. | 350—255 X |
| 2,430,595 | 11/1947 | Young | 350—199 X |

DAVID SCHONBERG, Primary Examiner

P. A. SACHER, Assistant Examiner

U.S. Cl. X.R.

350—44, 47, 199, 255, 294